United States Patent Office 2,855,436
Patented Oct. 7, 1958

2,855,436
PRODUCTION OF SUBSTITUTED ACRYLIC ACID AMIDES

Roelof Feike Rekker, Amsterdam, Netherlands, assignor to N. V. Koninklijke Pharmaceutische Fabrieken v/h Brocades-Stheeman & Pharmacia, Amsterdam, Netherlands, a Dutch company No Drawing. Application January 10, 1955
Serial No. 480,913
Claims priority, application Netherlands July 26, 1954
5 Claims. (Cl. 260—562)

The object of the present invention is derivatives of esters of beta-hydroxy acids and more particularly addition products of these esters and an organic mono-isocyanate.

Another object is the production of compounds having a condensed ring system showing the group

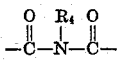

Still another object is the production of unsaturated amides.

It is known that organic mono-isocyanates and aliphatic alpha-hydroxy- or alpha-amino acids or esters of these acids form addition products which may be cyclized in several ways. Thus, oxazolidine-2.4 diones substituted in the 3- and, if desired in the 5-position are obtained from the alpha-hydroxy acids or from their esters. Substituted hydantoins are formed from the esters of alpha-amino-acids.

Cyclic compounds have been obtained from aliphatic esters of beta-amino acids by means of mono-isocyanates.

It has now been found that esters of beta-hydroxy-acids give addition products with organic mono-isocyanates. These addition products are of technical importance as intermediates.

The addition products of the aromatic esters can be brought to ring closure, which results in the formation of a condensed system of two six-membered rings. The addition products of the aliphatic esters give unsaturated amides substituted at the nitrogen atom. In this case, however, the presence of at least one hydrogen atom at the alpha-carbon atom is essential, as the substitution of both hydrogen atoms at the alpha-carbon atom by organic radicals prevents further conversion, or results in the splitting of the addition products into the original starting materials.

When it is desired to prepare the above mentioned condensed ring systems or unsaturated amides, isolation of the addition products is unnecessary.

The cyclized compounds all comprise the grouping

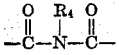

wherein R₄ stands for the organic radical of the isocyanate. These compounds are of pharmacological importance.

The acid amides substituted at the nitrogen atom are important, e. g. as insecticides or as basic substances for the preparation of polymerization products.

The various reactions mentioned above may be chemically represented by the equations:

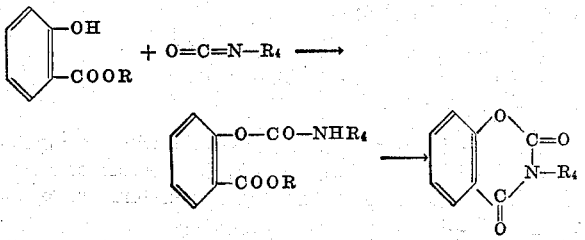

and

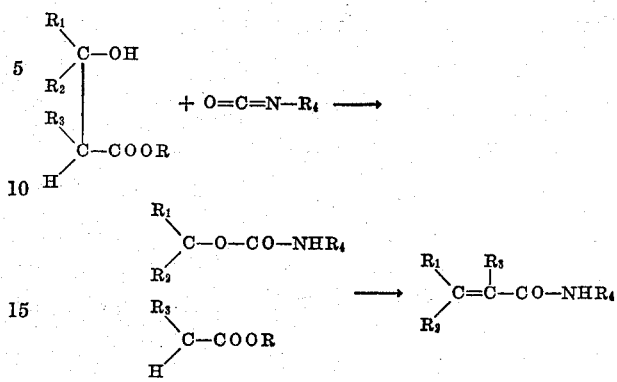

wherein R represents the radical of any alcohol, preferably a lower alkyl group, R₁, R₂ and R₃ represent a lower alkyl group, which may be the same or different, R₄ represents an organic radical, preferably a lower alkyl group or a phenyl group.

For simplicity's sake esters wherein R is a methyl or an ethyl radical have been used as the starting materials in the examples, without, however, limiting the invention to these esters.

The conversion of the addition products into cyclized systems or into unsaturated amides generally proceeds fairly smoothly.

The reaction can be carried out in several ways. A very suitable method proved to be the dissolution of the addition product in a liquid inert towards alkali metals and refluxing the solution after addition of a small amount of an alkali metal. Often the alkali metal may be omitted. Mere heating of the addition products may also lead to the object in view.

In technical respects it has mostly been found practical not to isolate the isocyanate as such, but to distil it as a reaction product from the reaction mixture in which it has been formed, into the ester to be converted, as has been described in the Netherlands patent specification No. 69,840.

*Example I*

With cooling, 30 g. of methyl isocyanate are added to 60 g. of the ethyl ester of beta-hydroxy-butyric acid. After half an hour the mixture is brought to a temperature of about 80° C., and is maintained for about 3 hours at this temperature. The reaction mixture is subsequently filtered and the filtrate is distilled in vacuo. The addition product thus formed, the ethyl ester of methylcarbamylo-beta-hydroxy-butyric acid, boils at 145–150° C. at a pressure of 12 mm. Yield: 65 g.

65 g. of the above ester are dissolved in 200 ml. of dry toluene and refluxed for 6 hours in the presence of 1 g. of sodium. The reaction mixture is filtered and the toluene is removed by distillation at a reduced pressure. The residue consists of N-methyl-crotonic acid amide which has a boiling point of 133–135° C. at 13 mm. and a melting point of 67–69° C. Yield: 25 g.

6 g. of the N-methyl-crotonic acid amide obtained according to this example are dissolved in 30 ml. of toluene. After the addition of 0.15 g. of azo-isobutyric acid dinitrile the mixture is refluxed for 5½ hours. The solid material which settles after cooling is collected on a filter and washed with a small amount of toluene. The yield of the polymerized product is 5.6 g.; melting point 98–110° C. Cryoscopically in benzene a molecular weight of 504 is found. The compound which is an unsaturated acid amide may be used as a starting material for the preparation of polymerization products.

Example II 37 g. of the ethyl ester of alpha-methyl-beta-hydroxybutyric acid and 16.5 g. of methyl isocyanate are dissolved in 50 ml. of dry toluene and heated at 90° C. for 2½ hours. After removal of a small amount of crystalline material the filtrate is fractioned, the fraction boiling at 140–143° C. at a pressure of 9–10 mm. being isolated. After two days' standing this fraction solidifies and is recrystallized from low-boiling petroleum ether. The melting point of the ethyl ester of methyl-carbamylo-alpha-methyl-beta-hydroxy-butyric acid thus obtained is 49–51° C. Yield: 21 g.

18 g. of the above ester are dissolved in 75 ml. of dry toluene. After addition of 1 g. of sodium, the mixture is refluxed for 2 hours. The reaction mixture is filtered and subsequently subjected to fractional distillation, yielding 7 g. of N-methyl-alpha-methyl-crotonic acid amide having a boiling point of 132–134° C. at a pressure of 20 mm.

Example III 22 g. of ethyl ester of beta-hydroxy-beta-methyl-butyric acid are dissolved, together with 12 g. of methyl isocyanate, in 50 ml. of dry toluene; the solution is heated at 50° C. for 4 hours.

The mixture is subsequently heated for another 2 hours at 100–110° C.; then the toluene is removed by distillation in vacuo. The residue is fractionated, the ethyl ether of methyl-carbamylo-beta-hydroxy - beta - methyl - butyric acid being thus obtained in a yield of 16.7 g.; boiling point: 171–176° C. at 11 mm.

10. g. of the above ester are dissolved in 30 ml. of dry benzene and refluxed for 3½ hours with 0.5 g. of sodium. The reaction mixture is filtered, freed of benzene and distilled in vacuo. 4 g. of N-methyl-beta-methyl-crotonic acid amide, boiling point 145–146° C. at a pressure of 10 mm., are obtained.

Example IV 20 g. of the ethyl ester of beta-hydroxy-alpha, beta-dimethyl-butyric acid are dissolved in 25 ml. of dry benzene. After addition of 10 g. of methyl isocyanate, the mixture is refluxed for 4 hours. The mixture is subsequently distilled at reduced pressure, yielding 25 g. of the ethyl ester of methyl-carbamylo-beta-hydroxy-alpha. beta-dimethyl-butyric acid, boiling point 190–195° C. at a pressure of 16 mm. The distillation entails some decomposition.

17 g. of the above ester are dissolved in 30 ml. dry benzene. After addition of 1 g. of sodium, the mixture is refluxed for 5 hours. After completion of the reaction the benzene is removed by distillation at a reduced pressure and the residue is distilled at a pressure of 4 mm. The boiling point of the compound at this pressure is 50–52° C. The compound formed is N-methyl-alpha.beta-dimethyl-crotonic acid amide.

Example V 35 g. of the ethyl ester of beta-hydroxy-alpha', beta-trimethyl-butyric acid are dissolved in 70 ml. of dry benzene. After addition of 16 g. of methyl isocyanate the mixture is refluxed for 6 hours. 5 g. of methyl isocyanate and 0.25 g. of sodium methylate are added, and the mixture is refluxed for another 4 hours. The reaction mixture is filtered, the benzene is removed by distillation at a reduced pressure and the residual liquid is filtered and distilled in vacuo. After a small amount of unconverted ester has been collected, the ethyl ester of methyl-carbamylo-beta-hydroxy-alpha, alpha', beta-trimethyl-butyric acid distils at a pressure of 0.6 mm. at a temperature of 122–125° C. After some time the compound solidifies. After recrystallisation from petroleum ether the melting point is 61–62° C. Yield: 14.5 g.

When an attempt is made to convert the ethyl ester of methyl-carbamylo-beta-hydroxy-alpha, alpha', beta-trimethyl-butyric acid in benzene or in toluene in a similar way as described in the preceding examples, no reaction with sodium metal is observed. In the reaction mixture only the original starting materials can be isolated.

Example VI 26.4 g. of the ethyl ester of beta-hydroxy-butyric acid and 23.8 g. of phenyl isocyanate are dissolved in 100 ml. of benzene and the mixture is refluxed for 3 hours. After cooling the solid material is filtered off; the filtrate is evaporated, an oil thus being obtained which crystallizes after come scratching. The yield of crude ethyl ester of phenyl-carbamylo-beta-hydroxy-butyric acid is 30 g.

30 g. of this crude product are dissolved in 100 ml. of benzene, while 1 g. of sodium is added. After the mass has been refluxed for 2 hours, 25 ml. of alcohol are added under cooling. The alcohol and benzene are removed by distillation and the residue is crystallized from aqueous alcohol. The crotonic acid anilide thus obtained melts at 115–116° C.; yield 11 g.

Example VII 50 g. of the methyl ester of salicylic acid are dissolved in 100 ml. of dry toluene. After 18.3 g. methyl isocyanate and 1 g. of sodium have been added, the mixture is heated at 40–50° C. for 2 hours, and subsequently at 100–110° C. for 3½ hours. The mixture first becomes gelatinous and finally almost entirely solid. In order to remove the remnants of sodium 500 ml. of absolute alcohol are added after completion of the reaction. After 4 hours' standing, the product is mixed with 200 ml. of benzene and subsequently poured into 4n sulphuric acid. The upper layer is separated off, washed with distilled water, dried over anhydrous sodium sulphate and evaporated in vacuo. The residue solidifies and is three times crystallized from 96% alcohol. Thus 3-methyl 2.4-dioxo-5.6-benzodihydro 1.3-oxazine, with a melting point of 146° is obtained; yield 47 g.

Example VIII 10 g. of the methyl ester of o-cresotic acid and 6 g. of ethyl isocyanate are dissolved in 50 ml. of dry toluene; 0.25 g. of sodium is added. The reaction starts spontaneously under evolution of heat. When the temperature decreases and the reaction appears to be completed the mixture is refluxed for 1 hour.

After filtration and evaporation of the solvent at a reduced pressure, the residue is cooled in an ice bath. The solid material which crystallizes is filtered off, washed with a small amount of toluene and recrystallized from petroleum ether. The 3-ethyl-6'-methyl 2.4-dioxo-dihydro(benzo-1'.2'.5.6)-1.3-oxazine thus obtained has a melting point of 80–81.5° C. The yield is 4.5 g.

What I claim is:

1. Process for the preparation of an unsaturated acid amide having the formula

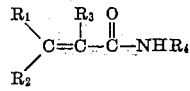

wherein $R_1$, $R_2$ and $R_3$ each is a representative of the class consisting of hydrogen and alkyl groups having not more than six carbon atoms and $R_4$ is a representative of the class consisting of the phenyl group and alkyl groups having not more than six carbon atoms, which comprises reacting a compound of the formula

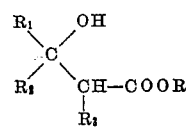

wherein R is the radical of any alcohol with a compound of the formula $O=C=N-R_4$ in the presence of a small quantity of an alkali metal at a temperature not exceeding 225° C.

2. A process as claimed in claim 1, wherein the compound of the formula

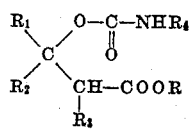

formed by reacting a compound

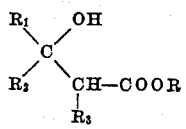

with a compound of the formula $O=C=N-R_4$ is isolated from the reaction mixture and used as starting material for the preparation of the unsaturated acid amide.

3. A process as claimed in claim 1, wherein the reaction mixture formed by reacting a compound of the formula

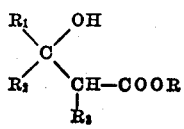

with a compound of the formula $O=C=N-R_4$ is directly converted into the desired end product.

4. A process as claimed in claim 1, wherein a solvent is used, which is indifferent to the alkali metal used.

5. A process as claimed in claim 1, wherein the alkali metal used is sodium.

References Cited in the file of this patent

UNITED STATES PATENTS

| | | |
|---|---|---|
| 2,417,748 | Hagemeyer | Mar. 18, 1947 |
| 2,447,822 | Senkus | Aug. 24, 1948 |
| 2,451,436 | Erickson | Oct. 12, 1948 |
| 2,476,559 | Nawiasky et al. | July 19, 1949 |
| 2,494,583 | Ratchford et al. | Jan. 17, 1950 |
| 2,508,279 | Lichtenwalter et al. | May 16, 1950 |

OTHER REFERENCES

Wagner et al.: Synthetic Organic Chemistry, page 645 (1953).